United States Patent [19]

St. John et al.

[11] Patent Number: 5,709,903
[45] Date of Patent: Jan. 20, 1998

[54] REDUCED FAT CONFECTIONERY PRODUCTS AND PROCESS

[75] Inventors: James F. St. John, Hummelstown; John G. Fetterhoff, Newville; John R. Carpenter; B. Douglas Brown, both of Hershey; C. Daniel Azzara, Annville; Stanley M. Tarka, Jr., Hershey; Craig Rank, Harrisburg; George K. Strohmaier, Hummelstown, all of Pa.

[73] Assignee: Derry, Inc., Newark, Del.

[21] Appl. No.: 509,529

[22] Filed: Jul. 31, 1995

Related U.S. Application Data

[62] Division of Ser. No. 968,927, Oct. 30, 1992, Pat. No. 5,464,649.

[51] Int. Cl.$^6$ .................. A23G 1/00; A23G 3/00
[52] U.S. Cl. .................. 426/660; 426/613; 426/659; 426/804
[58] Field of Search .................. 426/660, 631, 426/804, 613, 659

[56] References Cited

U.S. PATENT DOCUMENTS

| 2,451,630 | 10/1948 | McGee . | |
|---|---|---|---|
| 2,487,931 | 11/1949 | Lataner . | |
| 3,957,976 | 5/1976 | Sugimoto . | |
| 4,011,349 | 3/1977 | Riesen . | |
| 4,017,645 | 4/1977 | Ziccarelli . | |
| 4,081,559 | 3/1978 | Jeffery | 426/572 |
| 4,296,141 | 10/1981 | de Paolis | 426/660 |
| 4,408,041 | 10/1983 | Hirao et al. . | |
| 4,713,256 | 12/1987 | Chaveron et al. | 426/660 |
| 4,802,296 | 2/1989 | Kussendrager et al. | 127/31 |
| 4,810,516 | 3/1989 | Kong-Chan . | |
| 4,871,573 | 10/1989 | Bohren et al. | 426/588 |
| 4,888,196 | 12/1989 | Ehrman et al. . | |
| 4,925,695 | 5/1990 | Martin, Jr. et al. | 426/660 |
| 4,980,189 | 12/1990 | Keme et al. . | |
| 5,023,106 | 6/1991 | Ehrman et al. . | |
| 5,080,923 | 1/1992 | Martin, Jr. et al. | 426/660 |
| 5,223,303 | 6/1993 | Taskinen . | |
| 5,360,621 | 11/1994 | Mentink et al. . | |

FOREIGN PATENT DOCUMENTS

| 0284747 | 2/1988 | European Pat. Off. . |
|---|---|---|
| 0285187 | 2/1988 | European Pat. Off. . |
| 0390299 | 3/1990 | European Pat. Off. . |
| 0 390 410 | 10/1990 | European Pat. Off. . |
| 0 515 864 | 12/1992 | European Pat. Off. . |
| 60232058 | 4/1984 | Japan . |
| 644251 | 7/1984 | Switzerland . |
| 0677429 | 11/1988 | Switzerland . |
| 1032465 | 6/1966 | United Kingdom . |
| 1414384 | 11/1973 | United Kingdom . |
| 1472510 | 5/1975 | United Kingdom . |
| 2177283 | 1/1987 | United Kingdom . |
| WO88/08253 | 11/1988 | WIPO . |
| WO89/00142 | 9/1989 | WIPO . |
| WO91/09537 | 7/1991 | WIPO . |

OTHER PUBLICATIONS

R. Whymper, *The Manufacturing Confectioner*, pp. 17–24, "Soft-Grained Sugar For Making Chocolate" (Aug., 1954).
D.P.J. Moran et al., *Rev. Int. Choc.*, 24: 478–482, "The Influence of some Surfactants on the Viscosity of Confectionery Fat/Sugar Mixtures" (Dec. 12, 1969).

(List continued on next page.)

*Primary Examiner*—Daniel Stemmer
*Attorney, Agent, or Firm*—Scully, Scott, Murphy & Presser

[57] ABSTRACT

The present invention relates to a lowfat confection comprising a chocolate of full fat texture, said chocolate comprising a fat or fat substitute present in 20.0–24.5% (w/w), and nonfat solids comprising nutritive carbohydrate sweetener, nonfat cocoa solids and an edible emulsifier. The present invention further relates to a process for producing a lowfat chocolate and more specifically, to the process of preparing and formulating said product compositions.

57 Claims, 5 Drawing Sheets

OTHER PUBLICATIONS

*Analytical Methods of the Office Internaional du Cacoa et du Chocolat*, pp. 10–12, "Viscosity of Chocolate–determination of Casson yield value and Casson Plastic Viscosity" (1970).

H.F. Bamford, et al., *Rev. Int. Choc.*, 25: 226–228, "The Use of Polyglycerol Polyricinoleate in Chocolate" (Jun., 1970).

B.W. Minifie *The Manufacturing Confectioner*, pp. 19–26 "The Manufacture of Crumb Milk Chocolate and other methods of Incorporation of Milk in Chocolate" (Apr., 1974).

J. Chevalley, *Journal of Texture Studies* 6: 177–196, "Rheology of Chocolate" (1975).

L.R. Cook, *Chocolate Production and Use*, published by Books For Industry, Inc., New York, NY (1972), p. 214.

R. Lees, et al. *Sugar Confectionery and Chocolate Manufacture*, Chemical Publishing Co., Inc., New York, NY (1975), p. 124.

L. Bradford, *Flavours* Jul./Aug. 1976, pp. 177–179. "Manufacture And Use of YN In Confectionery".

B.L. Zoumas, et al., *Kirk–Othmer Encyclopedia of Chemical Technology*, vol. 6 3rd Ed., Wiley–Interscience Publication, New York, pp. 1–18, "Chocolate And Cocoa" (1979).

J. C. Musser, *The Manufacturing Confectioner*, pp. 1–10, "The Use of Monoglycerides In Chocolate and Confectionery Coatings" (Jun., 1980).

D. Ley, *Industrial Chocolate Manufacture and Use*, ed. S.T. Beckett, Blackie & Son Ltd., Glasgow and London by AVI, pp. 122–141, "Conching" (1988).

J. Chevalley, *Industrial Chocolate Manufacture and use*, ed. by S. T. Beckett, Blackie & Son Ltd., Glasgow and London by AVI, pp. 142–158, "Chocolate Flow Properties" (1988).

B.W. Minifie, *Chocolate, Cocoa, And Confectionery: Science and Technology*, Third Ed., Van Nostrand Reinhold, New York, p. 205 (1989).

Food and Drug Administration, *Federal Register* 46798, vol. 56, No. 179, "White Chocolate Deviating From Identify Standard: Temporary Permit For Market Testing" (Sep. 16, 1991).

S. T. Beckett, *PMCA Research Notes* 16 (1): 1–2 "Influencing the Rheological Behavior of Chocolate Mass" (Apr. 1992).

Technical Information: Amalty® Towa Chemicl Industry Co., 1990. pp. 1–9.

Developments in Dietetic Chocolate by Miss Anne Cridland, Confectionary Manufacture & Marketing 1987. pp. 1,2,4, & 6.

Malbit–Maltitol by Dr. Celia, 1985. pp. 1 & 25.

Gunstone, F.D., et al, *The Lipid Handbook*, 2nd Ed., Chapman & Hall Publishers, London, p. 394, col. 2, l. 14 to p. 395, col. 1, l. 3 (1994).

Peters, J.C., et al, *Journal of The American College of Toxicology*, vol. 10, No. 3 (1991), pp. 357–367.

REDUCED FAT CONFECTIONERY PRODUCTS AND PROCESS

This is a divisional of application Ser. No. 07/968,927, filed on Oct. 30, 1992, now U.S. Pat. No. 5,464,649.

BACKGROUND OF THE INVENTION

1. Field of the Invention

This invention relates generally to food product compositions, and more particularly to confectionery products, especially chocolate and chocolate-type products containing a nutritive carbohydrate sweetener, a fat or reduced calorie fat or combination thereof, and an edible emulsifier or surfactant, wherein the fat content is 20–24.5% by weight. In addition to the lowfat content, the food products of the present invention have rheology characteristics which are fully acceptable for moulding, enrobing and extruding operations. The present invention also relates generally to a process for producing a lowfat chocolate and more specifically, to the process of preparing and formulating said product compositions, e.g., confectionery products, especially chocolate and chocolate-type products having fat or reduced calorie fat content or combination thereof, in which the total fat or reduced calorie fat content can be as low as 20%.

2. Description of the Prior Art

Food products made from ingredients including a carbohydrate sweetener such as sucrose and an edible oil or fat such as cocoa butter are well known. An important group of these food products is comprised of confections, including candy.

The most popular chocolate or chocolate candy consumed in the United States is in the form of sweet chocolate or milk chocolate. Milk chocolate is a confection which contains nonfat milk solids, milkfat, chocolate liquor, a nutritive carbohydrate sweetener, cocoa butter and may include other optional ingredients such as emulsifiers and flavorings and other additives. Sweet chocolate differs from milk chocolate in that it requires more chocolate liquor and limits the amount of milk solids. Semisweet chocolate requires at least 35% by weight chocolate liquor and is otherwise similar in definition to sweet chocolate. Commonly known dark chocolate, generally containing only chocolate liquor, a nutritive carbohydrate sweetener and cocoa butter, is by definition either a sweet chocolate or a semisweet chocolate. Buttermilk chocolate and skim milk chocolate differ from milk chocolate in that the milk fat comes from various forms of sweet cream buttermilk and skim milk, respectively, and in the case of skim milk, the total amount of milkfat is limited to less than the minimum for milk chocolate. Mixed dairy product chocolates differ from milk chocolate in that the milk solid includes any or all of the milk solids listed for milk chocolate, buttermilk chocolate or skim milk chocolate. White chocolate differs from milk chocolate in that it contains no non-fat cocoa solids. As used herein, the term "chocolate" denotes chocolate, baking chocolate, milk chocolate, sweet chocolate, semisweet chocolate, buttermilk chocolate, skim milk chocolate, mixed dairy product chocolate, white chocolate and nonstandardized chocolates, unless specifically identified otherwise.

Chocolate used in foods in the United States is subject to a standard of identity established by the U.S. Food and Drug Administration (FDA) under the Federal Food, Drug and Cosmetic Act. The U.S. definitions and standards for the various types of chocolate are well established. Nonstandardized chocolates are those chocolates which have compositions which fall outside the specified ranges of the standardized chocolates.

Examples of nonstandardized chocolates result when the cocoa butter or milkfat are replaced partially or completely; or when the nutritive carbohydrate sweetener is replaced partially or completely; or flavors imitating milk, butter or chocolate are added or other additions or deletions in formula are made outside the USFDA standards of identify of chocolate or combinations thereof.

As a confection, chocolate can take the form of solid pieces of chocolate, such as bars or novelty shapes, and can also be incorporated as a component of other, more complex confections where chocolate is combined with and generally coats other foods such as caramel, nougat, fruit pieces, nuts, wafers or the like. These foods are characterized as microbiologically shelf-stable at 65°–85° F. under normal atmospheric conditions. Other complex confections result from surrounding with chocolate soft inclusions such as cordial cherries or peanut butter. Other complex confections result from coating ice cream or other frozen or refrigerated desserts with chocolate. Generally chocolate used to coat or surround foods must be more fluid than chocolates used for plain chocolate solid bars or novelty shapes.

The process of coating chocolate onto a food is known as enrobing. Enrobing is accomplished when the chocolate is in a fluid state and a proper viscosity must be maintained in order to produce a satisfactory coated product.

Chocolate can also be moulded. By moulding, it is meant that chocolate, either plain or mixed with nuts, raisins, crisped rice and the like is deposited in moulds, allowed to cool and hardened into solid pieces and then removed from the mould. Chocolate moulded into plain chocolate pieces generally can be somewhat more viscous than coating chocolates since the chocolate can be vibrated into a mould over a longer period of time than allowed in enrobing. However, chocolate moulded with food inclusions generally must be as fluid as coating chocolates.

Some novelty shapes made of plain chocolate are extruded onto a cold belt such as Kisses® or chocolate chips. Because the chocolate is extruded onto a cold belt, it must be more viscous than for moulded plain chocolate. Extruded chocolates are essentially extruded to a particular shape and require a yield value to retain the extruded shape while the chocolate hardens.

As noted above, the rheological characteristics, i.e., the flow properties, of chocolate are very important. Chocolate is non-Newtonian in nature. That is, it flows differently depending upon how the chocolate is stirred or pumped or how quickly it is poured. These characteristics are described by two measurements: a yield value, which relates to how much force one must use to start the chocolate flowing; and a plastic viscosity, which approximates the work done to keep the chocolate flowing uniformly. If either the yield value or the plastic viscosity is not within certain prescribed limits, poor processing will result. J. Chevalley, *J. Texture Studies*, 6: 177–196 "Rheology of Chocolate" (1975) reported typical Casson yield values and Casson plastic viscosities for commercial coating chocolates of 0–200 dyn/cm$^2$ and 5–25 poise, respectively, and for commercial moulding chocolates of 100–2000 dyn/cm$^2$ and 10–200 poise, respectively. These values were confirmed some thirteen years later by J. Chevalley, *Industrial Chocolate Manufacture and Use*, Blackie & Son Ltd. Glasgow and London by AVI (1988).

The process of making chocolate is reviewed generally in B. L. Zoumas and E. J. Finnegan, "Chocolate and Cocoa", Kirk-Othmer Encyclopedia of Chemical Technology, Vol. 6 (3rd Ed., Wiley-Interscience, New York) 1–19 (1985). Processes for producing chocolate can be either "wet" or "dry". In the "wet" process, sweetened condensed milk is codried with chocolate liquor to generate a crumb that is microbiologically stable. In the "dry" process, milk powder is utilized rather than condensed milk. As such, the ingredients as received are microbiologically stable.

The "dry" process of making chocolate consists essentially of the steps of mixing, refining, conching or liquefying, standardizing and tempering to generate the desired rheology as needed for enrobing, moulding or producing novelty shapes.

In the first step in the preparation of milk chocolate, a nutritive carbohydrate sweetener such as extra fine grade granulated sucrose is combined and mixed with cocoa butter, chocolate liquor and spray dried whole milk powder. The resulting mixture is a paste. Next, in the refining step, essentially a fine grinding operation, the coarse paste from the mixer is passed between steel rollers and converted to a refined flake. Refining breaks up crystalline sugar, fibrous cocoa matter and milk solids such that the sizes of the particles are significantly reduced. This particle size reduction results in the desired smoothness of the chocolate. Fine chocolates usually have no particles larger than 20 or 25 microns. This is usually accomplished by passing the mixture through a plurality of refining rolls.

In the conching step, the mixture is then stirred while heating to give the final desired consistency to the milk chocolate. This mixing-kneading process allows moisture and volatile components to escape while smoothing the chocolate paste and is critical to the flavor and texture development of the chocolate.

Alternatively to the conching step, the liquefying step mixes refined flake under high shear over a short period of time. The refined flake is quickly converted to a suspension of solids in a continuous fat phase. The lack of flavor development can be corrected by pretreating the liquor and cocoa butter.

Additional fat and emulsifier are then added in the standardizing or finishing step to adjust viscosity to final specifications.

The final step in obtaining the desired rheology of the chocolate is tempering, a process of inducing satisfactory crystal nucleation of the liquid fat in the chocolate. If the chocolate is improperly cooled, the resulting chocolate will have a grainy texture as well as poor color and appearance.

Finished chocolate is a suspension of very fine particles (usually less than 50 microns) in fat. The particles usually consist of cocoa solids and crystalline sucrose as well as milk solids in the case of milk chocolate. The cocoa solids in the chocolate liquor and the milk solids have normally been processed so they are fine enough to be incorporated into a chocolate mixture. Sucrose, however, requires considerable size reduction since extra fine grade sucrose, for example, typically varies in crystal size from about 40 to 1000 microns. To satisfactorily function as an ingredient in chocolate, therefore, these sucrose crystals should be reduced in size to less than about 50 microns. Similar considerations apply in the processing of other types of confections. It is known that at least about 50% of the surface area of particles in milk chocolate is produced by the presence of particles below two microns in size. The presence of these ultrafine particles increases viscosity and increasing amounts of fat, e.g., cocoa butter, are required to coat such particles in order for the chocolate to flow properly in manufacturing operations.

Of particular concern in today's market is the fat content of a product. The amount of total fat in chocolates may vary somewhat depending on the formulation and process involved. In recent years, in view of this concern, there has been a steady reduction in the total fat contents of all chocolate. See B. Minifie, *Chocolate, Cocoa, and Confectionery-Science and Technology*, 3rd Edition, Van Nostrand Reinhold, New York (1989) p. 205. In fact, as Minifie reports, "good-quality finely ground chocolates with total fat contents down to 28% can now be produced and satisfactorily moulded. Lower quality chocolates with coarser particle size can be produced down to 25%. Particularly with milk chocolate, quality suffers with fat contents below 30%, the texture becoming pasty with a lack of snap."

L. R. Cook, *Chocolate Production and Use*, Books for Industry, Inc., New York (1975) p. 214, reports that in order to maintain the proper rheological properties, chocolate requires a minimum amount of total fat from 29 to 32% by weight. It was commonly believed by the skilled artisan that if the fat level was below said range, quality defects such as mealy, dry or powdery texture, and excessive coating permeability leading to dry centers would result. S. T. Beckett, *PMCA Research Notes* 16 (1):1–2 (April 1992) reported the production of cake chocolate with a fat content as low as 25% but acknowledged the same was extremely "thick".

It is thus well known in the art that the amount of fat present in chocolate will affect the flow properties of the chocolate, i.e., the addition of fat to a chocolate decreases both the yield value and the plastic viscosity. Consequently, fat content must therefore be varied according to the intended use. For example, proper fat content for moulding chocolate was reported at 30–34% and 35–40% for covering chocolate by Lees and Jackson, *Sugar Confectionery and Chocolate Manufacture*, Chemical Publishing Co., Inc., New York (1975) pg. 124.

When the fat content of chocolate is reduced, other parameters must be affected in order to maintain the proper rheological properties of the chocolate. The presence of fat in chocolate is important in that the fat covers the surface of all the solid particles. Uncoated surfaces would cause rubbing between the particles and reduce the flow.

Chocolates contain a very large amount of small sugar particles. Fat does not cover the surface of the sugar particles very easily and consequently, anything which will form an interface between the sugar and fat will aid in the flow of the chocolate. Surfactants, e.g., emulsifiers, can produce such an interface by coating the surface of the solid particles, in particular, the sugar. As used herein, the term "surfactant" means any compound that reduces surface tension between a liquid and a solid in solution.

Emulsifiers or surfactants such as lecithin are extremely effective in improving the flow properties of chocolate, and are widely used for their commercial benefit as a partial cocoa butter replacer. It has been reported that the addition of 0.1–0.3% soya lecithin reduces the viscosity by more than 10 times its own weight of cocoa butter. Numerous other emulsifiers have been found to have similar effects as lecithin in lowering the yield value and plastic viscosity. Emulsifier use has generally been limited to less than 1% of the chocolate formulation due to problems such as off-flavors, legal controls, or negative rheological effects at high levels. Since full-fat chocolates at 29–33% total fat typically contain 0.1–0.5% soya lecithin, significantly lower fat levels cannot be achieved by altering the type/level of emulsifier.

Particle size of ingredients is also known to influence the viscosity of chocolate. As the particle size decreases, the viscosity increases as a general rule. An excess of fine particles below 5 microns whether derived from the sugar, milk, or chocolate liquor/powder component, will make the chocolate extremely thick and difficult to manage during pumping, depositing, and enrobing operations. Coarse particles will tend, however, to give the chocolate a gritty sandy texture which is unacceptable to consumers should the particle size exceed 60 microns.

Additionally, it is also well known within the chocolate industry that moisture content has a significant effect on the flow properties of chocolate. If water is added to chocolate, a marked increase in viscosity occurs. It has been previously reported that both the yield value and plastic viscosity increase with moisture levels above 1.1%. Between 0.6–1.1% moisture, the plastic viscosity is nearly constant whereas the yield value rises with increasing moisture. This could be explained by the formation of layers of syrup on the surface of sugar particles with an increase in moisture, which increases the friction between the said particles.

In order to produce a reduced fat chocolate with acceptable flow properties, it is essential to keep the moisture content low. Conching for extended periods of time (longer than 4 hrs.) at elevated temperatures (above 100° F.) is well known to be an effective method for removing water from chocolate paste. The initial ingredients should be selected to have low moisture, and chocolate processing should be done so that moisture uptake from the atmosphere by hygroscopic ingredients is kept to a minimum.

A review of 37 different branded chocolates made by chocolate manufacturers in Europe, Asia or the Americas indicates a range of fat for predominantly milk chocolate from 27.5% to 45.1% by weight fat with an average fat content of 32.7% by weight. Additionally, three branded nonstandardized chocolates manufactured either in Europe or the U.S. were observed with 25.4–26.0% fat. Four branded European dietary chocolates, whereby a sugar alcohol such as mannitol or sorbitol substituted for a nutritive carbohydrate such as sucrose, were by analysis observed to contain from 37.9% to 45.0% fat. Further, analysis of the coating chocolate used in the first 25% less calorie composite bar marketed in the U.S. revealed a coating with 28% fat content. However, to date, despite efforts in the industry, no one has been able to produce a chocolate consisting of less than 25% total fat having flow properties suitable for moulding, extruding or enrobing operations.

SUMMARY OF THE INVENTION

The present invention relates to an edible food product containing chocolate having the taste and texture attributes of a normal fat content with far less fat. Thus, the chocolate of the present invention is suitable for use in such products as confectioneries, (e.g., candy bars), baking chocolate, chocolate chips, ice cream bars, refrigerated desserts or other foods in which chocolate is an ingredient. In these foods, the chocolate has the rheological flow properties associated with normal fat content chocolate but with far less fat. The total fat content of chocolate compositions of the present invention is 20 to 24.5% by weight. The chocolate of the present invention contains non-fat solids which comprise nutritive carbohydrate sweeteners or sugar substitute, and an edible emulsifier.

The present invention further relates to methods of producing various types of chocolate, e.g., confectionery items, with a reduced total fat content which still has taste, texture, and flow properties similar to normal full-fat confectionery products. In the preferred products of the present invention, the total fat content is as low as 20% wt. In the present process, nutritive carbohydrate sweetener is mixed with a fat or reduced calorie fat or combination thereof. The mixture is refined to reduce the particle size. A surfactant is added to the mixture in the presence of water, and the mixture is dried under agitation and heated until the desired consistency with the desired fat content is obtained.

DETAILED DESCRIPTION OF THE INVENTION

Figure 1:
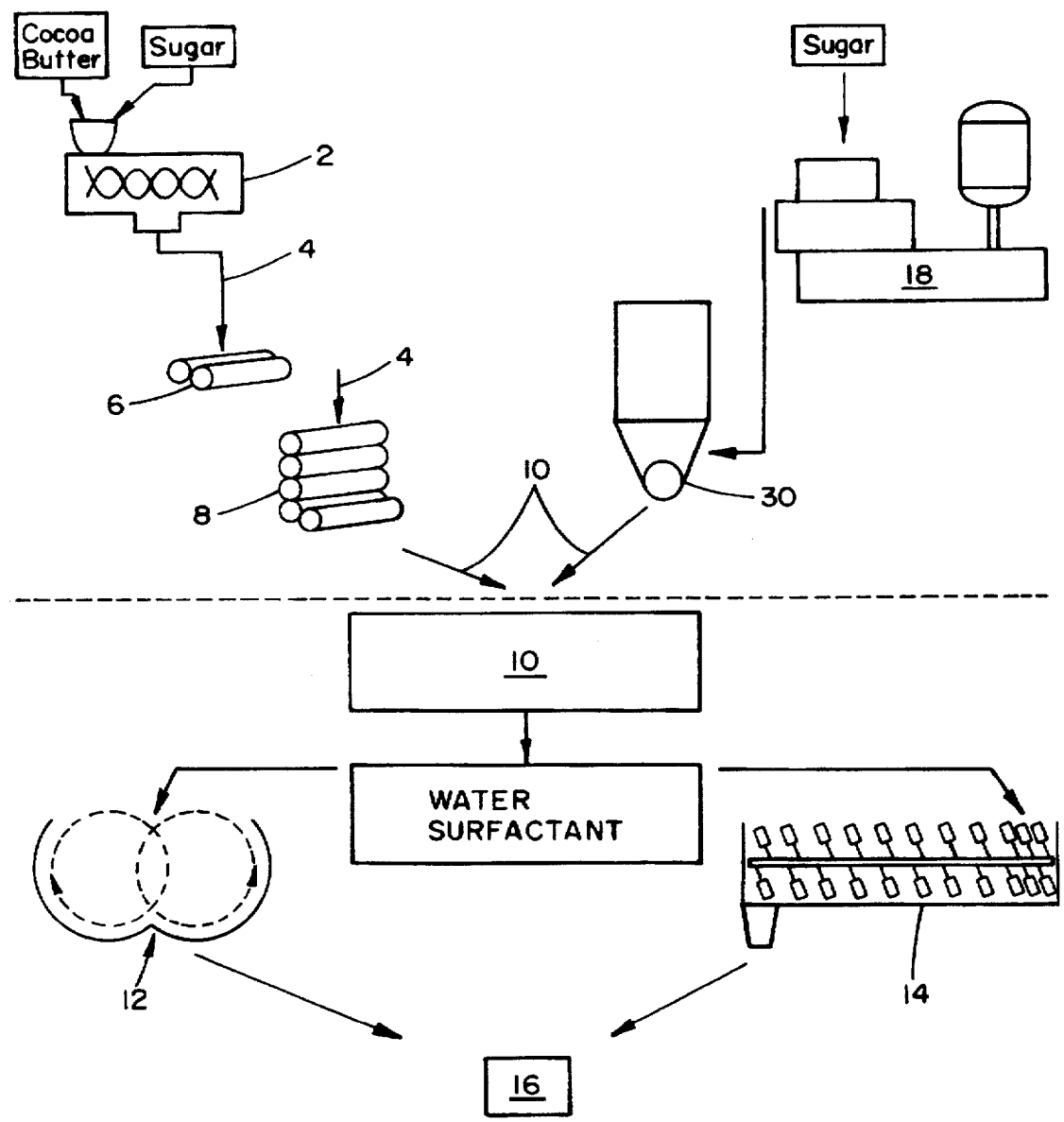
FIG. 1 represents a flow diagram of the modified process of refining the nutritive carbohydrate sweetener (e.g., saccharide) crystals of the present invention.

The present invention relates to a chocolate or chocolate-like food product in which the fat content is 20–24.5% by weight. The chocolate product contains a nutritive carbohydrate sweetener, a fat or reduced calorie fat or combination thereof and an edible emulsifier or surfactant.

In an alternative embodiment of the present invention, a sugar substitute may partially replace the nutritive carbohydrate sweetener. As used herein, the term "sugar substitute" includes bulking agents, sugar alcohols (polyols), or high potency sweeteners or combinations thereof.

The high potency sweeteners include aspartame, cyclamates, saccharin, acesulfame, neohesperidin dihydrochalcone, sucralose, alitame, stevia sweeteners, glycyrrhizin, thaumatin and the like and mixtures thereof. The preferred high potency sweeteners are aspartame, cyclamates, saccharin, and acesulfame-K.

Examples of sugar alcohols may be any of those typically used in the art and include sorbitol, mannitol, xylitol, maltitol, isomalt, lactitol and the like.

Bulking agents as defined herein may be any of those typically used in the art and include polydextrose, cellulose and its derivatives, maltodextrin, gum arabic, and the like.

Fats, as used herein, refer to triglycerides, diglycerides and monoglycerides that can normally be used in chocolates. Fats include the naturally occurring fats and oils such as cocoa butter, pressed cocoa butter, expeller cocoa butter, solvent extracted cocoa butter, refined cocoa butter and the like.

Reduced calorie fat, as used herein, is a fat having all the properties of typical fat but exhibiting less calories than typical fat. An example of a reduced calorie fat is Caprenin as described in U.S. Pat. No. 4,888,196 to Ehrman, et al., which is incorporated herein by reference.

The chocolate or chocolate type products of the present invention contain emulsifiers. Examples of safe and suitable emulsifiers may be any of those typically used in the art and include lecithin derived from vegetable sources such as soybean, safflower, corn, etc., fractionated lecithins enriched in either phosphatidyl choline or phosphatidyl ethanolamine or both, mono- and digylcerides, diacetyl tartaric acid esters of mono- and diglycerides, monosodium phosphate derivatives of mono- and diglycerides of edible fats or oils, sorbitan monostearate, polyoxyethylene sorbitan monostearate, hydroxylated lecithin, lactylated fatty acid esters of glycerol and propylene glycol, polyglycerol esters of fatty acids, propylene glycol mono- and diester of fats and fatty acids or any emulsifier that may become approved for the USFDA-defined soft candy category. In addition, other emulsifiers that can be used in the present invention, include polyglycerol polyricinoleate, ammonium salts of phosphatidic acid, sucrose esters, oat extract, etc., any emulsifier found to be suitable in chocolate or similar fat/solid system or any blend provided the total amount of emulsifier does not exceed 1% by weight. Emulsifiers preferred for use in the present invention are lecithin, fractionated lecithin, diacetyl tartaric acid esters of mono- and diglycerides (DATEM) or mixtures of these emulsifiers at a maximum level of 1% of any one emulsifier or any mixture of emulsifiers.

Nutritive carbohydrate sweeteners with varying degrees of sweetness intensity useful in the present invention may be any of those typically used in the art and include, but are not limited to, sucrose, (e.g., from cane or beet), dextrose, fructose, lactose, maltose, glucose syrup solids, corn syrup solids, invert sugar, hydrolyzed lactose, honey, maple sugar, brown sugar, molasses and the like. The nutritive carbohydrate sweetener, preferably sucrose, will be present in the chocolate as crystals or particles.

As indicated hereinabove, the particle size of the ingredients, especially the sweetener, can influence the viscosity of the chocolate. Particle sizes can be measured by various techniques known to those skilled in the art. These techniques include the Malvern® laser light scattering technique, measurement using a micrometer and measurement using a microscope and the like. Unless otherwise specified herein, when referring to the particle size of the nutritive carbohydrate sweetener, the measurements were taken using the Malvern® laser light scattering technique. Furthermore, unless otherwise specified herein, when referring to the particle size of the finished chocolate, the measurements were taken using a micrometer. In a preferred embodiment, the particle size of the nutritive carbohydrate sweetener and the nonfat cocoa solids are within a certain specified range in order to maintain specified rheological properties.

In an embodiment of the present invention, the size of the particles of the nutritive carbohydrate sweetener are substantially all between 1 to 60 microns. In a preferred embodiment, substantially all of the particles are between about 3–50 microns in size. In an even more preferred embodiment, substantially all of the particles are between about 5–40 microns in size. Less than 5% of the particles would be below the lower limit and less than 2% of the particles would be above the upper limit on a weight basis.

Maintaining substantially all of the nutritive carbohydrate sweetener particles greater than 1 micron allows use of minimum amounts of fat to develop the taste, texture and flow properties similar to a full-fat product. Particle sizes above 60 microns cause graininess.

In a preferred embodiment of the present invention, the chocolate or chocolate food product has 22–24.5% by weight of total fat or reduced calorie fat As used herein, unless otherwise specified, all percentages are calculated on a weight basis of ingredient to chocolate. For example, if an ingredient is present in 10%, it is meant that there are 10 g of that ingredient in 100 g of chocolate.

The chocolates of the present invention may contain a trace of water. It is preferred that they contain less than 1% moisture, preferably less than 0.75% by weight, in order to meet the flow requirements. Higher moisture is very detrimental to the Casson yield value and plastic viscosity and would otherwise require substantial additional fat to counteract its negative effect on rheology.

The chocolates of the present invention may additionally contain optional ingredients. These optional ingredients include nonfat milk solids, nonfat cocoa solids, sugar substitutes, natural and artificial flavors (e.g., vanillin, spices, coffee, ethyl vanillin, salt, brown nut-meats, natural vanilla, etc., as well as mixtures of these), antioxidants (e.g., preservatives such as TBHQ, tocopherols and the like), proteins, and the like.

In a preferred embodiment, the chocolate contains substantially all particles having a size of less than 45 microns as measured by a micrometer for coatings and less than 40 microns for solid bars and novelty shapes.

The preparation of a lowfat chocolate or a lowfat/reduced calorie chocolate having a fat content as low as 20% is prepared by the process described herein. In this process, the trick was to find a means of reducing the fat content while maintaining the rheological properties suitable for enrobing, moulding or extruding. The present inventors have developed such a process.

The process described herein is a general process for preparing these lowfat and lowfat/reduced calorie chocolates. However, the preferred products prepared by this process are the lowfat chocolates or the lowfat/reduced calorie chocolates defined herein wherein the fat content or the reduced calorie fat content, where applicable, is in the range from 20 to 24.5%, and more preferably from 22.0–24.5%.

As was described above, fat in chocolate, for rheological and organoleptic purposes is needed to coat all the surfaces of the solid and to fill the voids between these solids. If the total surface area and porosity of the solids is reduced, the fat requirements will be reduced. The total surface area and porosity can be reduced by two methods: either by reducing the surface area of the nutritive carbohydrate sweetener by a water addition and recrystallization operation, or by densifying some or all of the solids.

In U.S. Pat. No. 5,080,923 (Martin), granulated nutritive carbohydrate sweetener is first reduced in particle size to the finished product specification by various methods including milling and roll refining. Either before or after size reduction, the nutritive carbohydrate sweetener is blended with fat, i.e., cocoa butter. At this point water is blended into the mixture. The water dissolves the ultrafines (particles below 10 microns) and dissolves the angular and jagged edges of the larger particles. The mixture is dried. During drying, the nutritive carbohydrate sweetener in solution recrystallizes on the larger nutritive carbohydrate sweetener crystals which further rounds and smooths the particles. As a result of this procedure, an overall reduction of as much as 50% in surface area can be achieved. However, during the drying process, the nutritive carbohydrate sweetener has a tendency to agglomerate into particle sizes above the finished particle specification. To disperse these particles and achieve a smooth creamy texture in the finished chocolate, an additional size reduction step is required. Unfortunately, the additional step will not only disperse the agglomerates but may also crush individual particles and significantly increase the total surface area by introducing new ultrafines and angular and jagged surfaces. This additional surface area limits the fat savings potential of the technology and chocolates so that chocolates with only 27% fat can be obtained. However, the present invention overcomes the limitations inherent in Martin and brings the total fat content below 25%.

The improved process of refining nutritive carbohydrate sweetener crystals of the present invention eliminates the problem of agglomeration and the second size reduction step of Martin through the use of surfactants or emulsifiers. As in Martin, fat and nutritive carbohydrate sweetener are mixed and then passed through a particle size reduction process, typically roll refining or nutritive carbohydrate sweetener milling as shown in FIG. 1. In the roll refining process, the fat or reduced calorie fat or combination thereof and nutritive carbohydrate sweetener are mixed in batch mixer 2 to form a mixture 4 which is then passed through the nip of at least one pair of roll refiners (6, 8) to produce a mixture 10 having particles smaller than about 50 microns. Water, in the amount of 1 to 10% by weight of the nutritive carbohydrate sweetener, is added to the mixture 10 for the purpose of dissolving fines and rounding larger crystals.

Alternatively, the mixture 10 can be prepared by first refining the nutritive carbohydrate sweetener in a mill 18 and then blending the nutritive carbohydrate sweetener with the fat or reduced calorie fat or combination thereof in a blender 30 in accordance with procedures known to one skilled in the art.

In the prior process, when the mixture 10 is dried, agglomeration occurs. It has been discovered by the present inventors that adding a surfactant to the mixture 10 before drying prevents agglomeration. Accordingly, the addition of surfactants, e.g., lecithin, preferably in amounts less than 1% by weight, in the presence of small amounts of water, preferably 1–5% by weight, along with agitation throughout the drying process will prevent agglomeration. For the drying step, both batch and continuous driers yield a flowable, non-agglomerated paste. For batch drying, typical chocolate conches 12 yield good results. Typical drying times are from about 60 to about 120 minutes at temperatures of about 120° to about 160° F. For continuous drying, paddle driers 14 have proven successful. Typical drying times for paddle dryers are approximately 40 to about 120 minutes at temperatures of about 120° to about 180° F. for acceptable results. Both drying processes result in a nutritivs carbohydrate sweetener/fat paste 16 which is agglomerate free, flowable and has low viscosity. Preferably, in accordance with the present invention, the drying produces a product having 10–24% of fat (w/w) in the nutritive carbohydrate sweetener/fat paste. The moisture content is preferably less than 0.2% wt. No secondary size reduction step is necessary. This paste is then added to the other ingredients which have been reduced to finished particle size specification. This final mixture is conched and standardized to the specified fat level.

The process of the present invention also allows for flexibility in design. The desired reduction of the surface area of the nutritive carbohydrate sweetener can be accomplished with other confectionery ingredients present during the water/surfactant addition. These ingredients include chocolate liquor, cocoa powder, and milkfat.

Another method of reducing the surface area of the particle size of the sugar is by controlling the crystallization of a supersaturated solution of sugar while drying the sucrose syrup.

An additional method calls for the size reduction of sugar by any number of accepted milling techniques. A Micropul ACM mill will reduce the particle size of sugar within the desired range with a reduction of ultrafines and total surface area as compared to typical roll refining. Once the sweetener size has been reduced, the total surface area can be further reduced by physically removing particles below a specified size. Air classification can successfully separate smaller particles by taking advantage of the weight difference between the lighter small particles and the heavier larger particles. Other methods, such as screening, are also possible in removing the ultrafines from the size-reduced nutritive carbohydrate sweetener.

Aside from preparing the particle size of the nutritive carbohydrate sweetener, another method of reducing surface area is to densify any or all of the ingredients. In particular, dried milk solids can be greatly densified. Typically, spray dried whole milk powder (WMP) and spray dried non-fat milk solids (NFMS) are used in chocolate. Low density, highly porous sponge-like particles are created by the spray drying process. The density of the powder can be increased to a particularly dense state by either altering the spray drying process or by further processing of the dried product.

In a preferred embodiment, the nonfat milk solids are pretreated to compact the structure and crystallize a substantial portion of the lactose present in the milk solids. The bulk density (packed) should preferably exceed 0.7 g/ml and the degree of lactose conversion from the amorphous to crystalline state shall preferably exceed 30%, more preferably above 70%. Thus, nonfat dry milk powder can be prepared one of three ways to satisfy the preferred embodiment.

By introducing a lactose crystallization step before spray drying, the density of the dried powder is greatly increased. By precrystallizing the lactose, it enters the spray drier in a dense alpha monohydrated crystalline state and does not "puff-up" in a porous amorphous state. With lactose making up over 50% of NFMS, the overall density of the NFMS is increased.

For normal spray dried powder, the density can be increased by rewetting the powder and drying under pressure. The NFMS is dispersed into water (15 to 30% added water by weight relative to the NFMS) and dried under pressure either in a melange or through roll refiners. A secondary drying step is necessary to bring the final moisture to below 3%. During this process, the amorphous lactose is dissolved and dried in a crystalline state. The other solids are also pressurized and dried into a more collapsed, less porous state.

In a further method, the nonfat spray dried milk powder can also be compacted with sufficient heat and water in a twin screw extruder to collapse the protein structure and crystallize the amorphous lactose.

Apart from reducing the need for fat in confectionery items, another method to reduce fat is to make the fat which is present more functional. Much of the fat in typical chocolate products may be bound in some way and consequently are not available for lubrication. In WMP, as much as 90% of the milkfat may be trapped within the dried spheres. In chocolate liquor, some of the fat may be bound within the cellular structure. The present invention includes processes which will free the bound fat and allow it to be used for lubrication, consequently reducing the need for additional fat which would be required for the same purpose.

In the case of WMP, the fat can become. functional by a number of methods. NFMS with anhydrous milkfat (AMF) may be used to replace WMP. In this case nearly 100% of the milkfat becomes functional. Also, the WMP can receive post-processing to free the fat. The method of rewetting and drying under pressure as described above will free the fat from the spray dried particles. As the lactose dissolves and the structure breaks down, the milkfat is freed and becomes functional. The fat can also be released by blending 2 to 10% moisture with the WMP and processing through a high shear twin screw mixer. In this process, the WMP particle is softened by the water and the shear which allows the fat to escape.

When producing a non-standard chocolate product, bound fat in liquor may be made available by pressing the liquor to a low fat level, e.g., 8 to 12% by weight. The pressing of the liquor will rupture the cellular structure of the cocoa solids allowing cocoa butter to escape. This process reduces the fat in the cocoa solids and allows a total reduction in fat in the finished product without a loss in product quality or an increase in viscosity. A further reduction may be achieved by extracting the fat with solvents. In this case, the fat content of the cocoa powder will be well below 8% by weight and a greater fat reduction may be achieved.

Each of the above methods make it possible to reduce the fat content of chocolate products without increasing the viscosity or lowering the textural quality. In order to lower the fat content to below 25% and as low as 20% by wt., normally, these methods must be used in some combination. For milk and white chocolate, low fat levels can be achieved by using the improved process of refining the saccharide crystals and a combination of NFMS and AMF to replace the WMP. For dark and semi-sweet chocolates, the modified process of refining the saccharide crystals is needed for low fat production.

Figure 2:
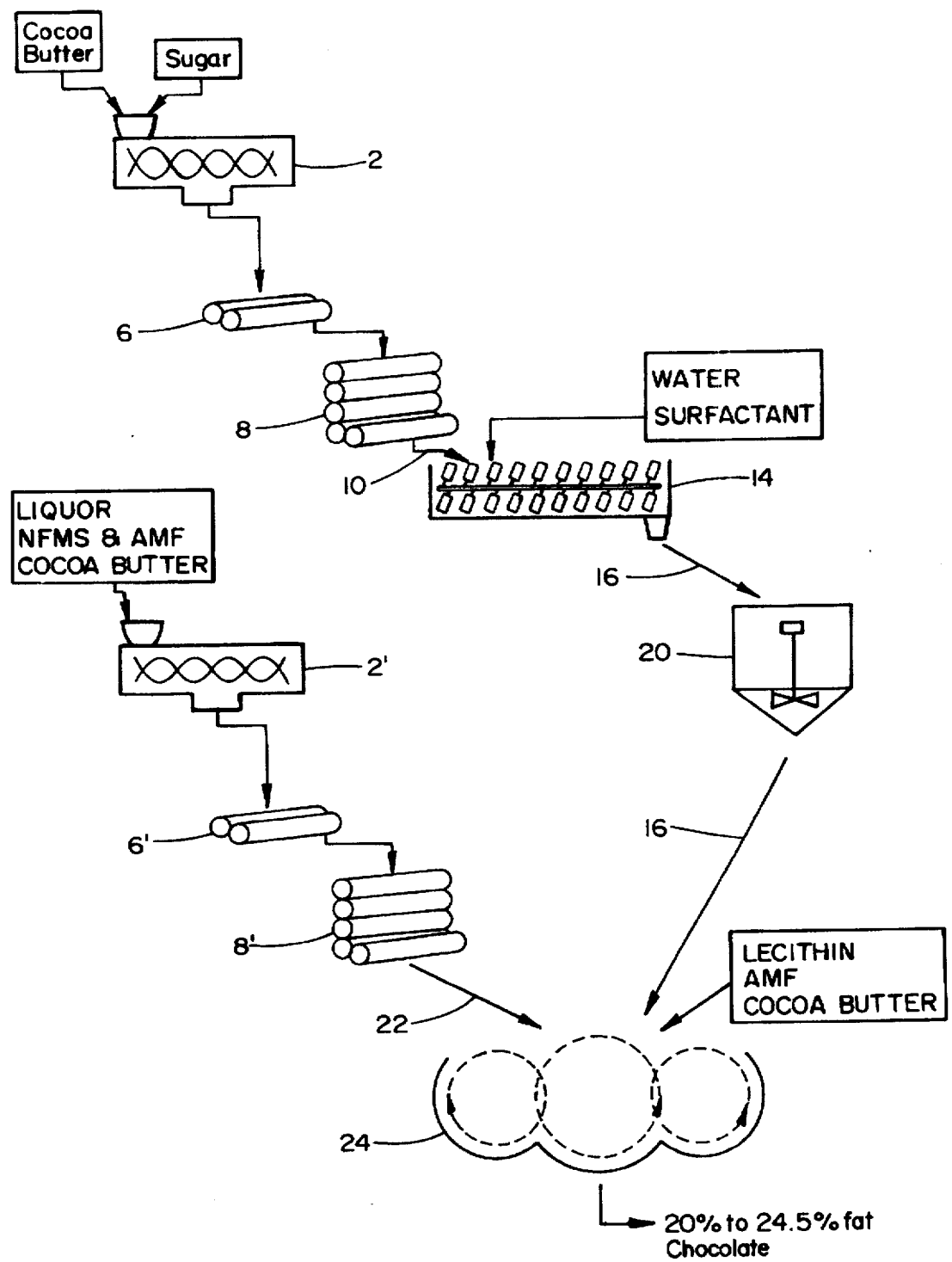
FIGS. 2 and 3 illustrate variations on the process for making a lowfat chocolate in accordance with the present invention.

FIG. 2 generally illustrates a process for preparing a lowfat chocolate in accordance with the present invention. Fat (e.g., cocoa butter) and nutritive carbohydrate sweetener or non-sugar sweetener are mixed in a batch mixer 2. As used herein, the non-sugar sweetener refers to a high potency sweetener or polyol or combination thereof. The mixture is subsequently refined by being passed through the nips of a plurality of roll refiners (6, 8) to produce a mixture 10 containing sweetener/fat particles (nutritive carbohydrate sweetener, non-sugar sweetener or combination thereof/fat particles), preferably smaller than about 60 microns. In this particular embodiment of the process of the present invention, water and surfactant are added to the sweetener/fat mixture and subjected to the drying process e.g., in a paddle dryer 14 (or in a conch) to obtain an 18 to 24% fat by weight sweetener/fat paste 16 with a moisture content of less than 0.2% wt. and which can be placed in storage 20.

Apart from the preparation of the sweetener/fat paste described above, the other chocolate-making ingredients may be prepared separately. Said additional ingredients include, but are but not limited to, nonfat milk solids, cocoa powder, chocolate liquor, lactose, milkfat, whole milk powder or mixtures thereof. With respect to FIG. 2, chocolate liquor, nonfat milk solids and anhydrous milkfat, and cocoa butter are mixed in a batch mixer 2' and subsequently refined by being passed through the nips of a plurality Of roll refiners (6', 8') to produce a mixture 22 having particles preferably smaller than about 50 microns.

The sweetener/fat paste 16 can then be mixed with the mixture 22 in a conch 24 while heating to give the final desired consistency to the chocolate. Additional fat and emulsifiers, e.g., lecithin, anhydrous milkfat and cocoa butter, are then added in the standardizing step, as shown in FIG. 2, to adjust the viscosity of the chocolate to final specifications and. to produce a 20–24.5% fat chocolate.

Figure 3:
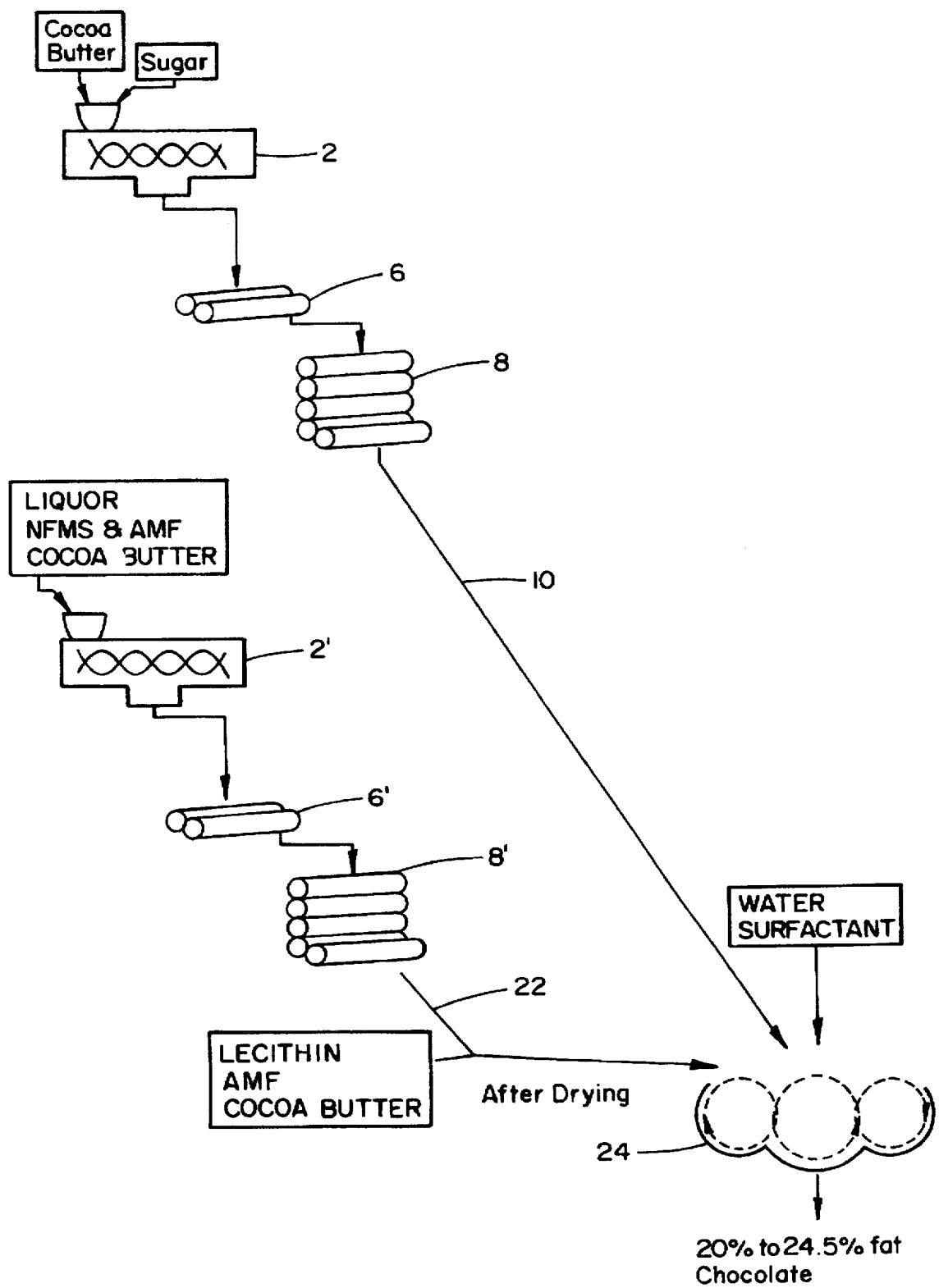

FIG. 3 illustrates a variation on the version of the process shown in FIG. 2. In the process shown in FIG. 3, after refinement, in accordance with the procedure described above and outlined in FIG. 2, the sweetener/fat mixture 10 is immediately subjected to a batch drying process in a conch 24. No paddle drying is used in this methodology, as in FIG. 2. The remainder of the process is similar to that of FIG. 2. More specifically, the other ingredients, e.g., liquor, NFMS, AMF, and cocoa butter are added, conched and standardized as in FIG. 2.

Figure 4:
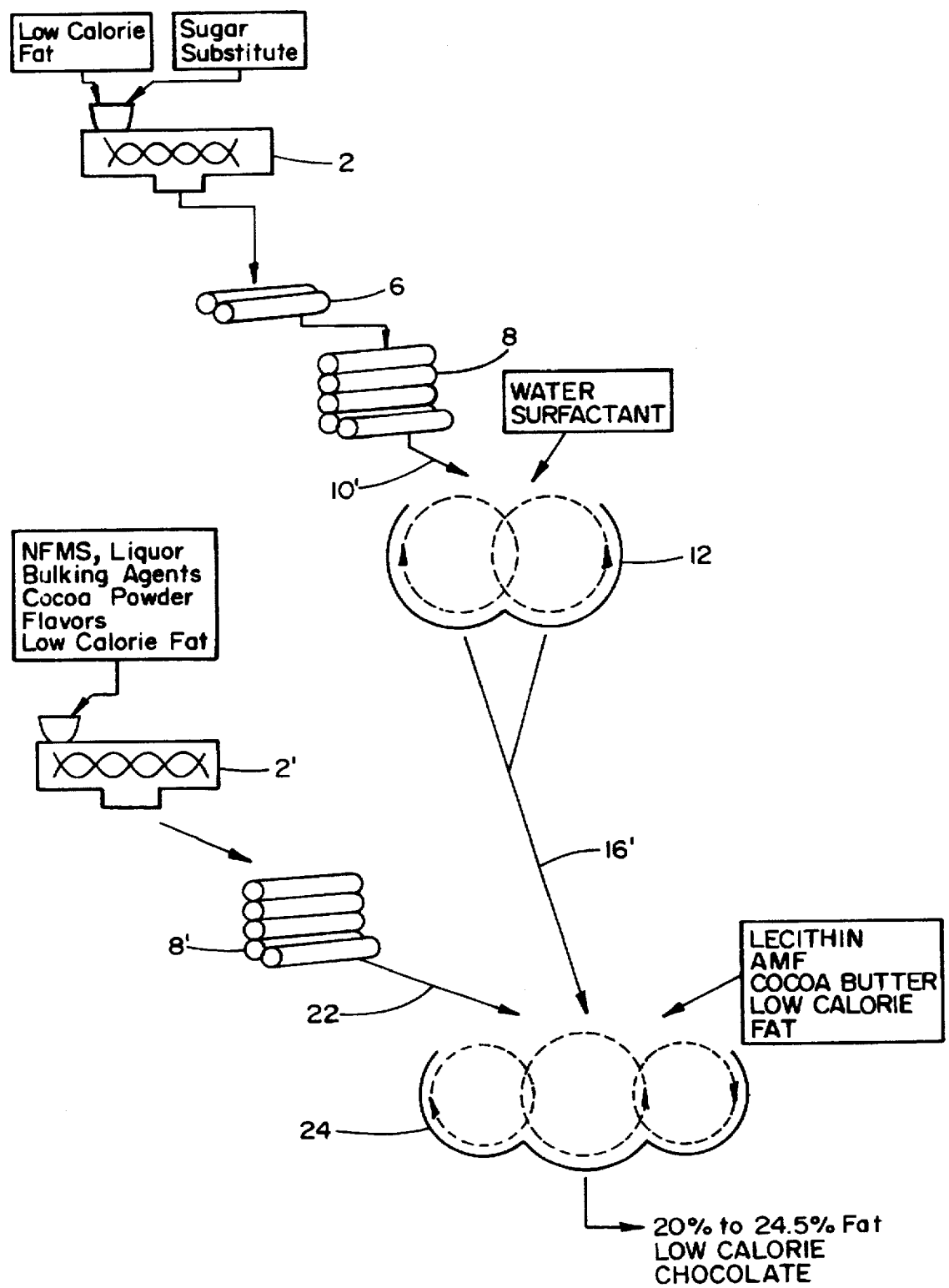
FIGS. 4 and 5 illustrate variations on the process for making a low fat/low calorie chocolate in accordance with the present invention.

FIG. 4 illustrates a further variation on the process of the present invention. FIG. 4 relates to the process of making a low fat/low caloric chocolate. A reduced calorie fat, such as Caprenin, is mixed with a sweetener comprising a non-nutritive sweetener and a nutritive sweetener and refined in accordance with the procedure described in the text hereinabove with regard to FIG. 2. This sweetener/lowfat mixture 10' is then dried by the techniques as described in relation to FIG. 2. For example, a paddle drier or a conch 12, such as illustrated in FIG. 4 can be used to produce a sweetener/lowfat paste 16' with a moisture content of less than 0.2% wt., and which can optionally be placed in storage.

The other lowfat/low calorie making ingredients, e.g., NFMS, liquor, bulking agents (such as polydextrose and the like), cocoa powder, flavors and low calorie fat, are prepared separately, as described above to produce a mixture 22' having particles preferably smaller than about 50 microns. The mixture 22' can then be mixed in a conch 24 while heating to give the final desired consistency to the chocolate. Additional fat, reduced calorie fat and surfactant are then added in the standardizing step, e.g., lecithin, AMF, cocoa butter and additional reduced calorie fat, to adjust the viscosity of the chocolate to final specifications and to produce a 20–24.5% fat reduced calorie chocolate.

Figure 5:
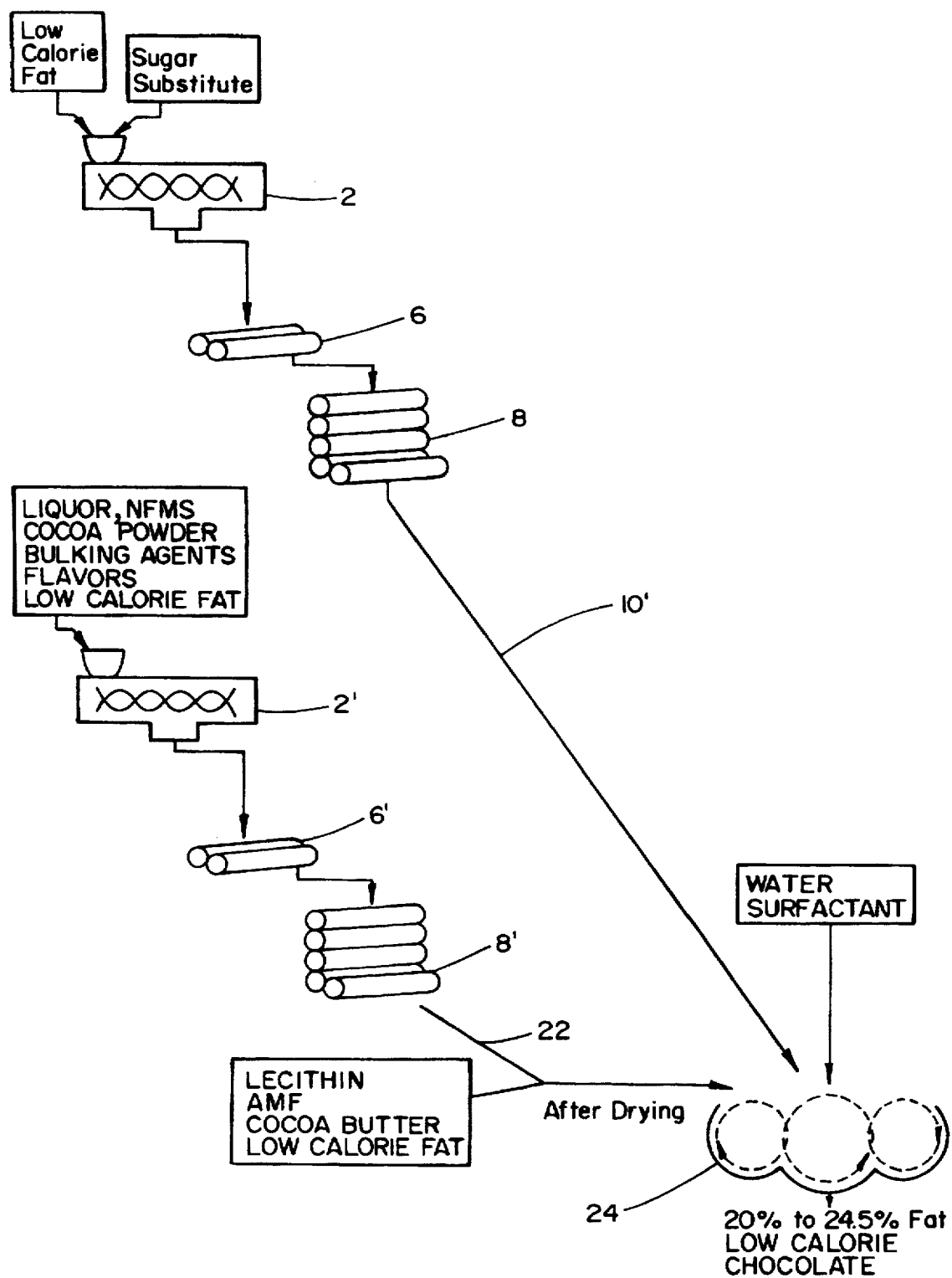

FIG. 5 shows yet another variation of the process of the present invention and illustrates the process of making a low fat/reduced calorie chocolate analogous to the process illustrated in FIG. 3, except that reduced calorie ingredients, e.g., low calorie fats, and bulking agents are used instead of fat.

The chocolates of the present invention can be used in a solid bar in which the entire bar is made up of solely chocolate. The solid bar is preferably a geometrical shape, for example, a circle, a rectangle or a square.

The chocolates of the present invention can additionally be used as a coating. As used herein, the term "coating" refers to a food which is covered or enveloped with a chocolate. Various foods which may be coated include fruits (e.g. cherries, strawberries, bananas and the like), marshmallow, cake, cookies, toffee, peanut butter, caramel, nuts, raisins, nougat, baked goods, ice cream bars, candy bars, puddings, creams and the like. Consequently, as used herein, a solid bar with inclusions is a type of coating.

Apart from being used in a solid bar and as a coating, the chocolates of the present invention can also be used in making novelty shapes as previously defined.

The preferred chocolate made according to the process of the present invention, which has desirable flow properties, contain 20 to 24.5% wt. total fat, preferably 22 to 24.5%. In addition, it preferably contains less than 7% milkfat, less than 1% moisture, preferably below 0.75% wt., and 35% minimum, preferably over 40%, nutritive carbohydrate sweetener with specific limitations on the sweetener particle size. Because of this unique composition, the chocolate of the present invention meets flow requirements for both moulding or enrobing. The values are presented in Table 1. It is noted that a different relationship than suggested by Chevalley (1970) of yield value and viscosity was observed due to the ability of the present invention to generate chocolate with uniquely low yield values. These uniquely low yield values allow chocolates with higher viscosities than suggested by Chevalley to function as coating chocolates in a production setting.

TABLE 1

RHEOLOGICAL VALUES

| | PRE-FERRED | MOST PRE-FERRED |
|---|---|---|
| A. For Solid Bars | | |
| Casson Yield Value (dyn/cm$^2$) | <200 | <100 |
| Casson Plastic Viscosity (poise) | <200 | <150 |
| Micrometer particle size of chocolate | <40 | <30 |
| B. For Coatings or solid bars with inclusions (enrobing, shell moulding) | | |
| Casson Yield Value (dyn/cm$^2$) | <80 | <35 |
| Casson Plastic Viscosity (poise) | <80 | <170 |
| Sum of Casson yield Value and Casson Plastic Viscosity | <160 | <205 |
| Micrometer particle size of chocolate | <45 | <45 |
| C. For Novelty Shapes-Extruded Chocolates (example-Kisses ®) | | |
| Casson Yield Value (dyn/cm$^2$) | <2000 | <300 |
| Casson Plastic Viscosity (poise) | <200 | <200 |
| Micrometer particle size of chocolate | <40 | <30 |

Milk chocolate must also, in addition to the requirements already given for the total fat, milkfat, moisture, rheology, and nutritive carbohydrate sweetener, contain a minimum of 8.61% milk solids-nonfat and 10% chocolate liquor, a range of 3.39–7.00% milkfat and maximum 1% safe and suitable emulsifier. The more preferred levels are 12–20% milk solids-nonfat, 3.39–5.00% milkfat, 12–15% chocolate liquor, and 0.5% maximum emulsifier. Cocoa butter may be added as needed to reach the desired total fat content. The proportion of milkfat to cocoa butter is important so that the desired degree of hardness is achieved in the chocolate. The milkfat component can be delivered by anhydrous milkfat (AMF), cream, butter, whole milk powder, nonfat milk powder or any mixture thereof.

A skim milk chocolate can be formulated by keeping the milkfat component under 3.39%, preferably under 1%, and raising the minimum milk solids nonfat component to 12%. A buttermilk chocolate is similar to skim milk chocolate except that dried sweet cream buttermilk serves as the milk solids nonfat component.

Mixed dairy product chocolates are similar to milk chocolate except the milkfat component may be below 3.39%. It is preferred that the milkfat component is 0 to 7%, and more preferably 0 to 5.5%. Mixed dairy product chocolates allow a wider choice as to the type of milk solids nonfat component.

Sweet chocolates are similar to milk chocolates except the chocolate liquor content is usually 15–35% and the total milk solids may not exceed 12%. For this invention the milkfat component preferably ranges from 0 to 7%, and more preferably from 0 to 3.5%. Semi-sweet chocolate (or bittersweet chocolate) is similar to sweet chocolate except the chocolate liquor content exceeds 35%.

A white chocolate of this invention conforming to the proposed standard of identity granted to Hershey Foods Corporation under a temporary marketing permit (56 Fed. Reg. 46798, Sept. 16, 1991) would preferably contain 23.5–24.5% total fat consisting of 3.5–4.5% milkfat and 20.0–21.0% cocoa butter, 35–55% nutritive carbohydrate sweetener, preferably 40–55%, 10.5% minimum milk solids nonfat, preferably 12–25%, and less than 0.5% chocolate liquor, preferably 0%.

Nonstandardized chocolates may contain sugar substitutes. Vegetable fats other than cocoa butter may replace some or all of the chocolate liquor to prepare a chocolate flavored confectionery such as compound coatings or imitation chocolate bars. Nonstandardized chocolates may also contain cocoa powders as partial or total substitutes for chocolate liquor. In a preferred embodiment, coarsely ground cocoa powder replaces over 50% of the total cocoa solids and is prepared by grinding or pulverizing a cocoa presscake so that less than 75% will pass through a U.S. standard screen #200 and less than 50% through a #400 screen. (Commercially available cocoa powders typically are ground in high impact mills such that 98%+ pass through a #200 screen and 90%+ through a #400 screen.) This coarsely ground cocoa powder can be fed into the nip of a roll refiner and final particle size reduction is accomplished by the rolls. This prevents the formation of an excessive amount of fine particles below 5 microns and thereby limits surface area which would otherwise require one to add more total fat in the chocolate for proper flow.

Chocolate with only 20–24.5% total fat is an excellent starting point for developing reduced calorie nonstandardized chocolates. A product with reduced calories can readily be obtained by utilizing a reduced calorie fat (such as Caprenin and the like), a sugar substitute or combinations thereof.

When the sugar substitute partially replaces the nutritive carbohydrate sweetener or when the reduced calorie fat partially or totally replaces the fat, or combination thereof, the resulting chocolate is a low fat reduced calorie chocolate. The low fat reduced calorie chocolate is a type of low fat chocolate as defined herein. This chocolate contains the same ingredients as the low fat chocolate as described hereinabove, with the noted exceptions. Thus, this low fat reduced calorie chocolate also contains an edible emulsifier and optionally nonfat cocoa solids. It may also contain trace amounts of water. Further it may contain the other ingredients found in the various types of chocolate described hereinabove, e.g. milk chocolate, skim milk chocolate, buttermilk chocolate, mixed dairy product chocolate, sweet chocolate, semisweet chocolate, bittersweet chocolate, white chocolate, and non-standardized chocolate, with the above exceptions. Further, this reduced calorie low fat chocolate contains the rheological characteristics of the low fat chocolate described herein.

Tables 2A through 2G present various formulations of different standardized chocolates made in accordance with the present invention.

TABLE 2A

STANDARDIZED MILK CHOCOLATE COMPOSITIONS MADE IN ACCORDANCE WITH THE PRESENT INVENTION
COMPOSITION

| | Amount (% wt.) | |
|---|---|---|
| Ingredients | Broad | Preferred |
| Total Fat | 20–24.5 | 22–24.5 |
| $^1$Sweetener: | | |
| Nutritive Carbohydrate Sweetener Sucrose | >35 | >40 |
| Milk Solids (nonfat): | | |
| NFMS, WMP or any mixture NFMS$^2$ | ≥8.61 | 12–20 |
| Milkfat: | | |
| Milkfat, cream, butter or from WMP | >3.39 | |

TABLE 2A-continued

STANDARDIZED MILK CHOCOLATE COMPOSITIONS MADE IN ACCORDANCE WITH THE PRESENT INVENTION COMPOSITION

| Ingredients | Amount (% wt.) Broad | Preferred |
|---|---|---|
| Anhydrous milkfat (AMF) | | 3.39–5.50 |
| Cocoa Solids: | | |
| Chocolate liquor | ≧10 | 12–15 |
| Emulsifier: | | |
| Any safe and suitable emulsifier | ≦1.0 | |
| Lecithin or DATEM or any combination thereof | | <1.0 |
| Moisture Content | <1.0 | <0.75 |

[1]Have been pretreated to meet the particle size requirement (substantially all between 1–60 microns, 3–50 microns preferred, and 5–40 microns most preferred; less than 5% of sweetener below lower limit and 2% above upper limit on a weight basis) by: (1) a refining and wetting process as described in U.S. Pat. No. 5,080,923 and improved herein to eliminate sugar fines; (2) a boiled sugar crystallization technique, or (3) grinding followed by size classification to remove both coarse sugar crystals and fine sugar particles.
[2]With over 30% lactose crystallization, preferably 70% or more, and bulk density (packed) over 0.7 g/ml.

TABLE 2B

STANDARDIZED SKIM MILK CHOCOLATE COMPOSITIONS MADE IN ACCORDANCE WITH THE PRESENT INVENTION COMPOSITION
(same as standardized milk chocolate except for:)

| Ingredients | Amount (% wt.) Broad | Preferred |
|---|---|---|
| Total Fat | 20–24.5 | 22–24.5 |
| Milk Solids (nonfat): | | |
| NFMS | ≧12 | |
| NFNS[2] | | 12–20 |
| Milkfat: | | |
| Milkfat, cream, butter or from NFMS | ≦3.39 | |
| Only from NFMS | | <1 |

[2]With over 30% lactose crystallization, preferably 70% or more, and bulk density (packed) over 0.7 g/ml.

TABLE 2C

STANDARDIZED BUTTER MILK CHOCOLATE COMPOSITIONS MADE IN ACCORDANCE WITH THE PRESENT INVENTION COMPOSITION
(same as standardized milk chocolate except for:)

| Ingredients | Amount (% wt.) Broad | Preferred |
|---|---|---|
| Total Fat | 20–24.5 | 22–24.5 |
| Milk Solids (nonfat): | | |
| Dried sweet cream buttermilk | ≧12 | |
| Dried sweet cream buttermilk[2] | | 12–20 |
| Milkfat: | | |
| Milkfat, cream, butter or from dried sweet cream buttermilk | ≦3.39 | |

TABLE 2C-continued

STANDARDIZED BUTTER MILK CHOCOLATE COMPOSITIONS MADE IN ACCORDANCE WITH THE PRESENT INVENTION COMPOSITION
(same as standardized milk chocolate except for:)

| Ingredients | Amount (% wt.) Broad | Preferred |
|---|---|---|
| Only from dried sweet cream buttermilk | | <1 |

[2]With over 30% lactose crystallization, preferably 70% or more, and bulk density (packed) over 0.7 g/ml.

TABLE 2D

STANDARDIZED MIXED DAIRY PRODUCT CHOCOLATE COMPOSITIONS MADE IN ACCORDANCE WITH THE PRESENT INVENTION COMPOSITION
(same as standardized milk chocolate except for:)

| Ingredients | Amount (% wt.) Broad | Preferred |
|---|---|---|
| Total Fat | 20–24.5 | 22–24.5 |
| Milk Solids (nonfat): | | |
| NFMS, WMP, dried sweet cream buttermilk or any mixture | ≧12 | |
| NFMS[2] | | 12–20 |
| Milkfat: | | |
| Milkfat, cream, butter or from WMP, NFMS or dried buttermilk | 0–24.5 | |
| AMF | | 0–5.5 |

[2]With over 30% lactose crystallization, preferably 70% or more, and bulk density (packed) over 0.7 g/ml.

TABLE 2E

STANDARDIZED SWEET CHOCOLATE COMPOSITIONS MADE IN ACCORDANCE WITH THE PRESENT INVENTION COMPOSITION
(same as standardized milk chocolate except for:)

| Ingredients | Amount (% wt.) Broad | Preferred |
|---|---|---|
| Total Fat | 20–24.5 | 22–24.5 |
| Milk Solids (nonfat): | | |
| NFMS, WMP, dried buttermilk or any mixture | ≦12 | |
| NFMS[2] | | 0–12 |
| Milkfat | 0–12.0 | 0–3.5 |
| Cocoa Solids: | | |
| Chocolate Liquor | 15–35 | 15–35 |

[2]With over 30% lactose crystallization, preferably 70% or more, and bulk density (packed) over 0.7 g/ml.

TABLE 2F

STANDARDIZED SEMISWEET (BITTERSWEET) CHOCOLATE COMPOSITIONS MADE IN ACCORDANCE WITH THE PRESENT INVENTION COMPOSITION
(same as standardized milk chocolate except for:)

| Ingredients | Amount (% wt.) Broad | Preferred |
|---|---|---|
| Total Fat | 20–24.5 | 22–24.5 |
| Milk Solids (nonfat): | | |
| NFMS, WMP, dried buttermilk or any mixture | ≦12 | |
| NFMS[2] | | 0–12 |
| Milkfat | 0–12.0 | 0–3.5 |
| Cocoa Solids: | | |
| Chocolate Liquor | ≧35 | 35–45 |

[2]With over 30% lactose crystallization, preferably 70% or more, and bulk density (packed) over 0.7 g/ml.

TABLE 2G

STANDARDIZED WHITE CHOCOLATE[3] COMPOSITIONS MADE IN ACCORDANCE WITH THE PRESENT INVENTION COMPOSITION
(same as standardized milk chocolate except for:)

| Ingredients | Amount (% wt.) Broad | Preferred |
|---|---|---|
| Total Fat | 23.5–24.5 | 23.5–24.5 |
| Sweetener-nutritive carbohydrate sweetener | 35–55 | 40–55 |
| Milk Solids (nonfat) | ≧10.5 | 10.5–20 |
| Milkfat | 3.5–4.5 | 3.5–4.5 |
| Cocoa Solids: | | |
| Cocoa Butter[4] | 20.0–21.0 | 20.0–21.0 |

[3]Based on temporary marketing permit to Hershey Foods Corp. published in 56 Fed. Reg. 46798, September 16, 1991.
[4]Cocoa powder and chocolate liquor must be absent, i.e., less than 0.5% wt., preferably 0%.

The chocolates prepared in the present invention can be used in edible food compositions such as confectioneries, chocolate chips, baking chocolate, chocolate covered fruits, chocolate covered baked goods, chocolate covered puddings, and the like. The chocolate of this invention can be used in a direct one to one substitution in edible food formulations wherever traditional chocolates are utilized.

The following examples are provided to further illustrate the present invention. In the following examples, rheology values of Casson plastic viscosity and Casson yield value were determined on a cone and plate system using a CarriMed/Mitech CS Rheometer. The cone is defined as: truncation of 101 μm, stress factor of 0.0597, rate factor of 14.4, diameter of 4 cm and cone angle of 3 degrees and 58 minutes used with a measurement system inertia of 63.6 dyn·cm·sec$^2$. The following conditions were used during measurement of the following chocolate examples: preshear stress of 0 dyn/cm$^2$, preshear time of 0 min and equilibration time of 1 min. The experiment mode of shear stress sweep was done at 40° C. starting at 0 dyn/cm$^2$ and ending at 2500 dyn/cm$^2$ (value of 2500 dyn/cm$^2$ used for Example 5) with a linear stress mode. (The ending shear stress was varied depending on the chocolate to give about a 9 sec$^{-1}$ shear rate response of the chocolate.) Ascent time was 8 min with no hold time at maximum shear stress followed by an 8 min descent time. Casson plastic viscosity and Casson yield value were calculated from the shear stress/shear rate data using CarriMed software written according to OICCC (1970). "Viscosity of Chocolate-determination of Casson yield value and Casson plastic viscosity", *Analytical Methods*, Analytical Methods of the Office International du Cacao et du Chocolat, pg. 10-E. The average of 3 ascending and 3 descending values of Casson yield value or Casson Plastic viscosity were averaged together to provide the rheology values which are set forth in the examples.

EXAMPLE 1

Sucrose and caprenin were combined at 20.78% fat and refined to 25 μm. The refined sucrose/caprenin mixture was mixed in a 5 qt bowl using a Hobart N-50mixer with an external bath temperature of 60° C. on speed 1. 3.2% distilled deionized water (referenced to the sucrose/caprenin mass) was added to sucrose/caprenin mixture while mixing. Within 10 minutes, 0.28% fractionated lecithin (40% phosphatidyl choline) (referenced to the sucrose/caprenin mass) was added and the sucrose/caprenin/lecithin mixture continued mixing until the water was removed resulting in a paste labeled "special process sugar". To 625 g of special process sugar, the following ingredients were added: 160 g of spray-dried nonfat milk (the lactose was crystallized by agitating and incubating concentrated skim milk prior to spray drying), 50 g polydextrose, 70 g cocoa powder (coarse ground), 21 g cocoa butter, 0.2 g vanillin, 12 g caprenin. This mixture was refined to 25 μm and then mixed on a Hobart N-50 mixer in a 5 qt Hobart bowl at 60° C. for 2 hr on speed 1. At the end of 4 hr, the nonstandardized chocolate paste was adjusted to 23.5% total fat with the addition of Caprenin and 0.5% fractionated lecithin (40% phosphatidyl choline). The particle size by micrometer of the final nonstandardized chocolate was 25 μm having a Casson yield value of 52 dyn/cm$^2$ and a Casson plastic viscosity of 50 poise. Compared to the leading solid milk chocolate bar, both calories and fat were reduced by 25%.

EXAMPLE 2

The same process as Example 1 was followed except that the amounts of the ingredients differed slightly prior to the second refining. To 683 g special process sugar, the following ingredients were added: 170 g of lactose-crystallized spray dried nonfat milk, 27 g polydextrose, 73 g coarse-ground cocoa powder, 15 g cocoa butter, 0.2 g vanillin, 5 g caprenin. This mixture was refined and mixed as in Example 1 and then adjusted to 0.5% fractionated lecithin (40% phosphatidyl choline) and 20% total fat with the addition of caprenin. The final non-standardized chocolate had a micrometer particle size of 26 μm, a Casson yield value of 130 dyn/cm$^2$ and a Casson plastic viscosity of 186 poise. Compared to the leading solid milk chocolate bar, calories were reduced 25% and the fat was reduced 36%.

EXAMPLE 3

The special process was followed as explained in Example 1 except that the fats added to the sucrose were 81.6% cocoa butter and 18.4% milkfat. However, the additional ingredients (denoted as "others") were refined separately from the special process sugar and were as follows: 160 g lactose-crystallized spray-dried nonfat milk, 135 g chocolate liquor and 0.2 g vanillin. The others were refined to 30 μm. Then, 295 g others were combined with 691 g special process sugar and mixed as in Example 1 and then standardized to 23.5% fat using milkfat and 0.4% fractionated lecithin (40% phosphatidyl choline). The final milk chocolate had micrometer particle size of 30 μm, a Casson yield value of 20 dyn/cm$^2$ and Casson plastic viscosity of 93 poise.

EXAMPLE 4

The process for the special process sugar of Example 3 was followed as above except that the emulsifier added was diacetyl tartaric acid esters of mono- and diglycerides (DATEM). The others were as in Example 3 and were refined to 40 μm and combined with the special process sugar as in Example 3. After mixing the chocolate as in Example 3, the chocolate was adjusted to 23.5% total fat with the addition of milkfat and to 0.44% total emulsifiers by the addition of fractionated lecithin (35% phosphatidyl choline). The final milk chocolate had a micrometer particle size of 39 μm, a Casson yield value of 16 dyn/cm$^2$ and a Casson plastic viscosity of 114 poise.

EXAMPLE 5

The special process sugar was produced as follows: 580 g sucrose was combined with 8 g milkfat, 135 g chocolate liquor and 87 g cocoa butter. This composition was refined to 25 μm. The refined composition was treated as in Example 1 for processing of the special process sugar. The "others" were composed of 160 g lactose-crystallized spray dried nonfat milk, 16 g milkfat and 0.2 g vanillin. The "others" were refined to 40 μm and combined with the special process sugar. After mixing as described in Example 1, the chocolate was adjusted to 20% total fat by addition of milkfat and to 0.4% fractionated lecithin (40% phosphatidyl choline). The milk chocolate's micrometer particle size was 39 μm with a Casson yield value of 56 dyn/cm$^2$ and a Casson plastic viscosity of 184 poise.

EXAMPLE 6

Special process sugar was prepared in Example 1 except that cocoa butter was used instead of Caprenin. The "others" were composed of 211 g lactose crystallized spray-dried nonfat milk, 0.3 g vanillin, 35 g milkfat and 20 g cocoa butter. These components were refined to 32 μm and then combined with 698 g special process sugar and mixed as in Example 1. The finished white chocolate was adjusted to 24% total fat using cocoa butter and 0.34% total emulsifiers with the addition of soya lecithin. The micrometer particle size of the final white chocolate was 32 μm with a Casson yield value of 37 dyn/cm$^2$ and a Casson plastic viscosity of 82 poise.

EXAMPLE 7

Sucrose and cocoa butter were mixed to a ratio of 79/21 and were refined to 30 microns (by micrometer). The refined flakes were loaded in a Frisse DUC 200 conch. While mixing, water was added at 3.2% of the weight of refined flakes. Within 10 minutes, fractionated lecithin was added at 0.3% of refined flakes. The mixture was left mixing at 160° F. until the water was removed and resulted in a mixture designated as the special process sugar. In a separate mixer, chocolate liquor and lactose crystallized nonfat milk powder were combined, mixed and refined to 30 microns (by micrometer). The refined chocolate liquor and milk powder were combined with the special process sugar. The combination was conched and standardized with anhydrous milkfat, cocoa butter and lecithin. The milk chocolate final total fat content was 26.4% having a Casson yield value of 15 dyn/cm$^2$ and a Casson plastic viscosity of 40 poise.

EXAMPLE 8

To 1215 g of granulated sucrose, 700 g of chocolate liquor was added, mixed and refined to 30 microns (by micrometer). The refined flakes were added to a 5 quart Hobart mixer. While mixing, 30 g water was added and after 10 minutes 5 g fractionated lecithin was added. The mixture was then mixed for 4 hr at 140° F. The semisweet chocolate was standardized to 24.4% fat resulting in a Casson yield value of 72 dyn/cm$^2$ and Casson plastic viscosity of 135 poise.

EXAMPLE 9

Special process sugar was made according to Example 6 except that a polyglycerol ester was used instead of fractionated lecithin. The others were composed of 69 g lactose, 152 g nonfat milk powder, 115 g chocolate liquor and 2 g diacetyl tartaric acid ester of mono- and diglycerides (DATEM) and were mixed together and refined to 41 microns (by micrometer). The others were combined with 599 g special process sugar, mixed as in Example 1. The final milk chocolate was standardized to 25.0% fat having a Casson yield value of 5 dyn/cm$^2$ and a Casson plastic viscosity of 29 poise.

The above preferred embodiments and examples are given to illustrate the scope and spirit of the present invention. The embodiments and examples described herein will make apparent, to those skilled in the art, other embodiments and examples. These other embodiments and examples are within the contemplation of the present invention. Therefore, the present invention should be limited only by the appended claims.

What is claimed is:

1. A process for making a reduced fat chocolate of full-fat texture comprising the following steps:
   (a) mixing a nutritive carbohydrate sweetener with a fat to form a sweetener/fat mixture;
   (b) refining said mixture of step (a);
   (c) blending the refined mixture obtained in step (b) with water, said water being present in amounts effective to dissolve the particles having a size less than about 10 microns in said sweetener;
   (d) adding a surfactant to the mixture of step (c) in amounts effective to prevent agglomeration of the nutritive carbohydrate sweetener;
   (e) agitating and drying the mixture of step (d) to obtain a lowfat nutritive carbohydrate sweetener/fat paste;
   (f) adding at least one size-reduced ingredient selected from the group consisting of cocoa solids, non-fat milk solids, cocoa powder, chocolate liquor, lactose, milkfat, whole milk powder and mixtures thereof to the paste of step (e), said ingredient being selected to provide the desired type of chocolate;
   (g) conching or liquefying the paste of step (f); and
   (h) standardizing the paste of step (g) to the specified fat level.

2. The process according to claim 1 wherein said fat is present in the amount of about 10–24% wt. of said nutritive carbohydrate sweetener/fat paste of step (e).

3. The process according to claim 1 wherein said nutritive carbohydrate sweetener/fat paste of step (e) contains a moisture content of less than about 0.2% wt.

4. The process according to claim 1 wherein the refining step (b) is a roll refining process and the mixture of step (a) is passed through the nip of at least one pair of roll refiners.

5. The process according to claim 1 wherein said water of step (c) is added in an amount of about 1% by weight of the nutritive carbohydrate sweetener.

6. The process according to claim 1 wherein said surfactant is added in an amount of about 0.1–0.5% by weight of the sweetener/fat mixture.

7. The process according to claim 1 wherein said surfactant is selected from the group consisting of lecithin, a fractionated lecithin, diacetyl tartaric acid esters of mono- and diglycerides, polyglycerol esters and mixtures thereof.

8. The process according to claim 1 wherein in said refining step, substantially all of the particles of said mixture are reduced to about less than 50 microns.

9. The process according to claim 1 wherein in said refining step, substantially all of the particles of said mixture are reduced to about less than 40 microns.

10. The process according to claim 1 which additionally comprises adding to steps (a), (c) or (d) additives comprising chocolate liquor, cocoa powder, nonfat cocoa solids, lactose, milkfat or mixtures thereof.

11. The process according to claim 1 wherein the final fat content of said chocolate is from about 20–24.5% by weight.

12. The process according to claim 1 wherein said size reduced ingredient is non-fat milk solids and said nonfat milk solids are pretreated to compact the structure and crystallize a substantial portion of the lactose present in said milk solids.

13. The process according to claim 12 wherein said pretreated nonfat milk solids have over 30% lactose crystallization and a bulk density over 0.7 g/ml.

14. The process according to claim 13 wherein said pretreated nonfat milk solids have over 70% lactose crystallization.

15. The process according to claim 1 wherein the fat is cocoa butter.

16. A process for making a reduced calorie chocolate of full-fat texture comprising the following steps:
(a) mixing a nutritive carbohydrate sweetener with a mixture comprising a chocolate confectionery fat and reduced calorie fat to form a sweetener/fat mixture;
(b) refining said mixture of step (a);
(c) blending the refined mixture obtained in step (b) with water, said water being present in amounts effective to dissolve the particles having a size less than about 10 micrometers in said sweetener;
(d) adding a surfactant to the mixture of step (c) in amounts effective to prevent agglomeration of the nutritive carbohydrate sweetener;
(e) agitating and drying the mixture of step (d) to obtain a reduced calorie sweetener/fat paste;
(f) adding at least one size-reduced ingredient selected from the group consisting of low calorie fat, sugar substitute, cocoa solids, non-fat milk solids, cocoa powder, chocolate liquor, lactose, milkfat, nonfat milk solids, anhydrous milkfat and mixtures thereof to the paste of step (e), said ingredient being selected to provide the desired type of chocolate;
(g) conching or liquefying the paste of step (f); and
(h) standardizing the paste of step (g) to the specified fat level.

17. The process according to claim 16 wherein said reduced calorie fat is caprocaprylobehenin.

18. The process according to claim 16 wherein in the refining step, substantially all the particles of said mixture are reduced to about less than 50 microns in size.

19. The process according to claim 16 wherein in the refining step, substantially all of the particles of said mixture are reduced to about less than 40 microns in size.

20. The process according to claim 16 wherein said sweetener/fat paste of step (e) contains a moisture content of less than 0.2% wt.

21. The process according to claim 16 wherein the refining step (b) is a roll refining process and the mixture of step (a) is passed through a nip of at least one pair of roll refiners.

22. The process according to claim 16 wherein said water of step (c) is added in an amount of at least about 1% by weight of the nutritive carbohydrate sweetener.

23. The process according to claim 16, wherein said surfactant is added in an amount of about 0.1–0.5% by weight of the sweetener/fat mixture.

24. The process according to claim 16, wherein said surfactant is selected from the group consisting of lecithin, a fractionated lecithin, diacetyl tartaric acid esters of mono- and diglycerides, polyglycerol esters and mixtures thereof.

25. The process according to claim 16 which additionally comprises adding to steps (a), (c) or (d) additives comprising chocolate liquor, cocoa powder, nonfat cocoa solids, lactose, milkfat or mixtures thereof.

26. The process according to claim 16 wherein the final fat content of said chocolate is from 20–24.5% by weight total fat.

27. The process according to claim 16 wherein the fat present in step (e) ranges from about 10–24% by weight of the nutritive carbohydrate sweetener/fat paste of step (e).

28. The process according to claim 16 wherein substantially all of the particles in said chocolate are less than about 50 microns.

29. The process according to claim 16 wherein substantially all of the particles in said chocolate are less than about 40 microns.

30. The process according to claim 16 wherein said surfactant is an emulsifier.

31. The process according to claim 16 wherein said size reduced ingredient is non-fat milk solids and said nonfat milk solids are pretreated to compact the lactose present in said milk solids.

32. The process according to claim 31 wherein said pretreated nonfat milk solids have over 30% lactose crystallization and a bulk density over 0.7 g/ml.

33. The process according to claim 32 wherein said pretreated nonfat milk solids have over 70% lactose crystallization.

34. The process according to claim 16 wherein the chocolate confectionery fat is cocoa butter.

35. The process according to claim 1 or 16 wherein said size reduced ingredient is a mixture of nonfat milk solids and anhydrous milkfat.

36. The process according to claim 1 or 16 wherein the nutritive carbohydrate sweetener is sucrose, dextrose, fructose, lactose, maltose, glucose syrup solids, corn syrup solids, invert sugar, hydrolyzed lactose, honey, maple sugar, brown sugar or molasses.

37. The process according to claim 36 wherein the nutritive carbohydrate sweetener is sucrose.

38. A process for making a reduced fat chocolate of full fat texture comprising the following steps:
(a) refining a nutritive carbohydrate sweetener in a dry mill;
(b) mixing a fat with said refined nutritive carbohydrate sweetener of step (a) to form a sweetener/fat mixture;
(c) blending the refined mixture obtained in step (b) with water, said water being present in amounts effective to dissolve the particles in said sweetener having a size less than about 10 microns;
(d) adding a surfactant to the mixture of step (c) in amounts effective to prevent agglomeration of the nutritive carbohydrate sweetener;
(e) agitating and drying the mixture of step (d) to obtain a low fat nutritive carbohydrate sweetener/fat paste;
(f) adding at least one size-reduced ingredient selected from the group consisting of cocoa solids, non-fat milk solids, cocoa powder, chocolate liquor, lactose, milkfat, whole milk powder and mixtures thereof to the paste of step (e), said ingredients being selected to provide the desired type of chocolate;
(g) conching or liquefying the paste of step (f); and
(h) standardizing the paste of step (g) to the specified fat level.

39. A process for making a reduced fat chocolate of full fat texture comprising the following steps:
 (a) refining a nutritive carbohydrate sweetener in a dry mill and removing from said refined sweetener particles whose size is less than about 10 microns;
 (b) adding a fat to the product of step (a) to form a sweetener/fat mixture;
 (c) blending the mixture in step (b) with water, said water being present in amounts effective to dissolve the particles having a size less than about 10 microns in said mixture;
 (d) adding a surfactant to the mixture of step (c) in amounts effective to prevent agglomeration of the nutritive carbohydrate sweetener;
 (e) agitating and drying the mixture of step (d) to obtain a low fat nutritive carbohydrate sweetener/fat paste;
 (f) adding at least one size-reduced ingredient selected from the group consisting of cocoa solids, nonfat milk solids, cocoa powder, chocolate liquor, lactose, milkfat, whole milk powder and mixtures thereof to the paste of step (e), said ingredient being selected to provide the desired type of chocolate;
 (g) conching or liquefying the paste of step (f); and
 (h) standardizing the paste of step (g) to the specified fat level.

40. A process for making a reduced calorie chocolate of full-fat texture comprising the following steps:
 (a) refining a nutritive carbohydrate sweetener in a dry mill;
 (b) mixing a chocolate confectionery fat and a reduced calorie fat with said refined nutritive carbohydrate sweetener of step (a) to form a sweetener/fat mixture;
 (c) blending the refined mixture obtained in step (b) with water, said water being present in amounts effective to dissolve in said sweetener the particles having a size less than about 10 microns;
 (d) adding a surfactant to the mixture of step (c) in amounts effective to prevent agglomeration of the nutritive carbohydrate sweetener;
 (e) agitating and drying the mixture of step (d) to obtain a nutritive carbohydrate sweetener/fat paste;
 (f) adding at least one size-reduced ingredient selected from the group consisting of a low calorie fat, a sugar substitute, cocoa solids, non-fat milk solids, cocoa powder, chocolate liquor, lactose, milkfat, non-fat milk solids, anhydrous milkfat and mixtures thereof to the paste of step (e), said ingredient being selected to provide the desired type of chocolate;
 (g) conching or liquefying the paste of step (f); and
 (h) standardizing the paste of step (g) to the specified fat level.

41. A process for making a reduced calorie chocolate of full fat texture comprising the following steps:
 (a) refining a nutritive carbohydrate sweetener in a dry mill and removing from said refined sweetener particles whose size is less than about 10 microns;
 (b) adding a mixture comprising a chocolate confectionery fat and a reduced calorie fat to the product of step (a) to form a sweetener/fat mixture;
 (c) blending the mixture in step (b) with water, said water being present in amounts effective to dissolve the particles having a size less than about 10 microns in said mixture;
 (d) adding a surfactant to the mixture of step (c) in amounts effective to prevent agglomeration of the nutritive carbohydrate sweetener;
 (e) agitating and drying the mixture of step (d) to obtain a nutritive carbohydrate sweetener/fat paste;
 (f) adding at least one size-reduced ingredient selected from the group consisting of a low calorie fat, a sugar substitute, cocoa solids, non-fat milk solids, cocoa powder, chocolate liquor, lactose, milkfat, non-fat milk solids, anhydrous milkfat and mixtures thereof to the paste of step (e), said ingredient being selected to provide the desired type of chocolate;
 (g) conching or liquefying the paste of step (f); and
 (h) standardizing the paste of step (g) to the specified fat level.

42. The process, according to any one of claims 38, 39, 40 or 41, wherein the total fat present in step (e) ranges from about 10–24% by weight of the nutritive carbohydrate sweetener/fat paste of step (e).

43. The process according to any one of claims 38, 39, 40 or 41, wherein said sweetener/fat paste of step (e) contains a moisture content of less than about 0.2% by weight of the chocolate.

44. The process according to any one of claims 38, 39, 40 or 41, wherein said surfactant is lecithin, a fractionated lecithin, diacetyl tartaric esters of mono- and diglycerides, polyglycerol esters or mixtures thereof.

45. The process according to any one of claims 38, 39, 40 or 41, wherein substantially all of the particles in said chocolate are less than about 50 microns.

46. The process according to any one of claims 38, 39, 40 or 41, wherein substantially all of the particles in said chocolate are less than about 40 microns.

47. The process according to any one of claims 38, 39, 40 or 41, wherein said water of step (c) is added in an amount of at least about 1% by weight of the nutritive carbohydrate sweetener.

48. The process according to claim 47, wherein said water of step (c) is added in an amount of at least about 10% by weight of the nutritive carbohydrate sweetener.

49. The process according to any of claims 38, 39, 40 or 41, wherein said size-reduced ingredient is non-fat milk solids, and said non-fat milk solids are pretreated to compact the lactose present in said milk solids.

50. The process according to claim 49, wherein said pretreated non-fat milk solids have over 30% lactose crystallization and a bulk density over 0.7 g/ml.

51. The process according to claim 50, wherein said pretreated non-fat milk solids have over 70% lactose crystallization.

52. The process according to any of claims 38, 39, 40 or 41, wherein said size-reduced ingredient is a mixture of non-fat milk solids and anhydrous milkfat.

53. The process according to any of claims 38, 39, 40 or 41, wherein the nutritive carbohydrate sweetener is sucrose, dextrose, fructose, lactose, maltose, glucose syrup solids, corn syrup solids, invert sugar, hydrolyzed lactose, honey, maple sugar, brown sugar or molasses.

54. The process according to claim 53, wherein the nutritive carbohydrate sweetener is sucrose.

55. The process according to claim 38 or claim 39, wherein the fat is cocoa butter.

56. The process according to claim 40 or claim 41, wherein said reduced calorie fat is caprocaprylobehenin.

57. The process according to claim 40 or claim 41, wherein the chocolate confectionery fat is cocoa butter.

* * * * *

UNITED STATES PATENT AND TRADEMARK OFFICE
CERTIFICATE OF CORRECTION

PATENT NO. : 5,709,903
DATED : January 20, 1998
INVENTOR(S) : James F. St. John, et al.

It is certified that error appears in the above-identified patent and that said Letters Patent are hereby corrected as shown below:

Column 9, line 39: "nutritivs" should read --nutritive--

Column 11, line 54: "Of" should read --of--

Column 15, line 41, Table 2b: "$NFNS^2$" should read -- $NFMS^2$ --

Signed and Sealed this

Fourth Day of April, 2000

Attest:

Attesting Officer

Q. TODD DICKINSON

Director of Patents and Trademarks